(12) United States Patent
Saldhana

(10) Patent No.: US 8,806,637 B2
(45) Date of Patent: Aug. 12, 2014

(54) AUTHORIZATION FRAMEWORK

(75) Inventor: Anil J. Saldhana, Oak Park, IL (US)

(73) Assignee: Red Hat, Inc., Raleigh, NC (US)

(*) Notice: Subject to any disclaimer, the term of this patent is extended or adjusted under 35 U.S.C. 154(b) by 1003 days.

(21) Appl. No.: 11/761,175

(22) Filed: Jun. 11, 2007

(65) Prior Publication Data
US 2008/0307506 A1    Dec. 11, 2008

(51) Int. Cl.
*G06F 21/00* (2013.01)

(52) U.S. Cl.
USPC .......................................... 726/24

(58) Field of Classification Search
USPC .......................................... 726/4
See application file for complete search history.

(56) References Cited

U.S. PATENT DOCUMENTS

| | | | | |
|---|---|---|---|---|
| 5,579,529 | A * | 11/1996 | Terrell et al. | 710/8 |
| 7,409,710 | B1 * | 8/2008 | Uchil et al. | 726/19 |
| 2003/0110131 | A1 * | 6/2003 | Alain et al. | 705/51 |
| 2004/0123162 | A1 * | 6/2004 | Antell et al. | 713/202 |
| 2004/0133656 | A1 * | 7/2004 | Butterworth et al. | 709/219 |
| 2005/0234735 | A1 * | 10/2005 | Williams | 705/1 |
| 2008/0046719 | A1 * | 2/2008 | Kim et al. | 713/156 |
| 2008/0134286 | A1 * | 6/2008 | Amdur et al. | 726/1 |
| 2008/0256610 | A1 * | 10/2008 | Patrick | 726/4 |

OTHER PUBLICATIONS

"Java Authorization Contract for Containers", Sun Microsystems, Nov. 24, 2003.*

* cited by examiner

*Primary Examiner* — Lisa Lewis
(74) *Attorney, Agent, or Firm* — Lowenstein Sandler LLP

(57) ABSTRACT

Embodiments of the present invention provide an authorization framework that can accept one or more pluggable authorization modules and the final authorization decision can be a collective decision of these modules based on some criteria. The authorization framework of the present invention can be used by an application to call upon one or more pluggable authorization modules, which can be configured externally by some mechanism, to make individual authorization decisions. The overall authorization decision by the authorization framework is cumulative decision of the individual modules based on some criteria that can be configured. Each pluggable authorization module can be configured to perform its own authorization decision making process that can be different from those of the other modules.

14 Claims, 4 Drawing Sheets

AUTHORIZATION FRAMEWORK

DESCRIPTION OF THE INVENTION

1. Field of the Invention

The present invention relates to computer security, and more particularly, it relates to controlling access to resources of a computer system.

2. Background of the Invention

Java has a security architecture that is intended to protect systems from malicious code. In particular, the Java security system includes an authentication subsystem and an authorization subsystem, which is known as the Java Authentication Authorization Service (JAAS). The JAAS authorization scheme is designed to ensure that only authorized code are granted access to the resources of a computer.

JAAS uses a security model that is code-centric or user-centric in combination with a policy file. In particular, JAAS primarily evaluates whether the code being executed can be trusted or whether the user of the code can be trusted. The policies for evaluating the level of trust to be granted to the code or user is then specified by the policy file.

However, this security model may not be enough for many enterprise applications. For example, an enterprise may want to use custom security repositories, such as LDAP (lightweight directory access protocol), a database, or another file system. Typically, this sort of custom security logic is implemented by writing customized modules or policy files that interface into JAAS.

Unfortunately, such modification of JAAS requires a good understanding of the modules and processes involved in JAAS. Although JAAS allows for customization of authorization and policies implemented, this customization requires a significant amount of coding to create proper classes and tale care of both the configuration and policy files.

Accordingly, it would be desirable to provide an authorization framework that is easily configured to accommodate a custom security repository. It would also be desirable to provide an authorization framework that can allow access control mechanisms to be added or changed as needed.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The present invention is an authorization framework that can accept one or more pluggable authorization modules and determines an authorization decision based on the decisions of these pluggable authorization modules. The authorization decision is a collective decision which is based on a configurable criteria or policy. Each pluggable authorization module can be configured and/or developed to perform its own authorization decision making process independent of the processes used by the other pluggable authorization modules.

The concept of the present invention is to allow for a plugin architecture so that multiple decisions can be made, weighted, and combined into a final decision by the authorization framework. This architecture allows a computer system to dynamically add new authorizations more easily than is possible with known authorization systems, such as JAAS.

JAAS essentially takes a monolithic approach to authorization. That is, JAAS performs authorization using the concept of "least privilege." Under least privilege, authorization is based on the intersection of privileges granted to a user or code. As a result, the "least" amount of privilege granted is the determining factor for JAAS authorization. Deviating from this approach requires special method calls or custom policies. This approach by JAAS is difficult to customize and requires a significant amount of code.

For example, if a user of an application is supposed to have rights to resource A, which implies rights to resources B, C, etc., then under JAAS this is declared as permissions in the Java code, which a call to the JAAS service. However, suppose at a later time after the code for the application has been deployed, the same user should now be given rights to another resource D. In known Java and JAAS, this new permission must typically be added to the code as a new permission or the code must be modified, which is a tedious process, subject, to error, and the like.

In contrast, the authorization framework of the present invention could simply incorporate a new that evaluates the condition and permits the new authorization to resource D without having to modify the existing code base. Instead, a plugin would merely have to be created and interfaced to the authorization framework for this new permission. In essence, an abstraction or indirection mechanism has been provided to allow for authorization decisions to be made.

In some embodiments, the plugin modules can be written according to a standardized adapter or application programming interface (API) without having to understand or know the details of the authorization framework. A new plugin could be declared to the authorization framework in various ways, such as a change to configuration file referenced by the authorization framework.

Figure 1:
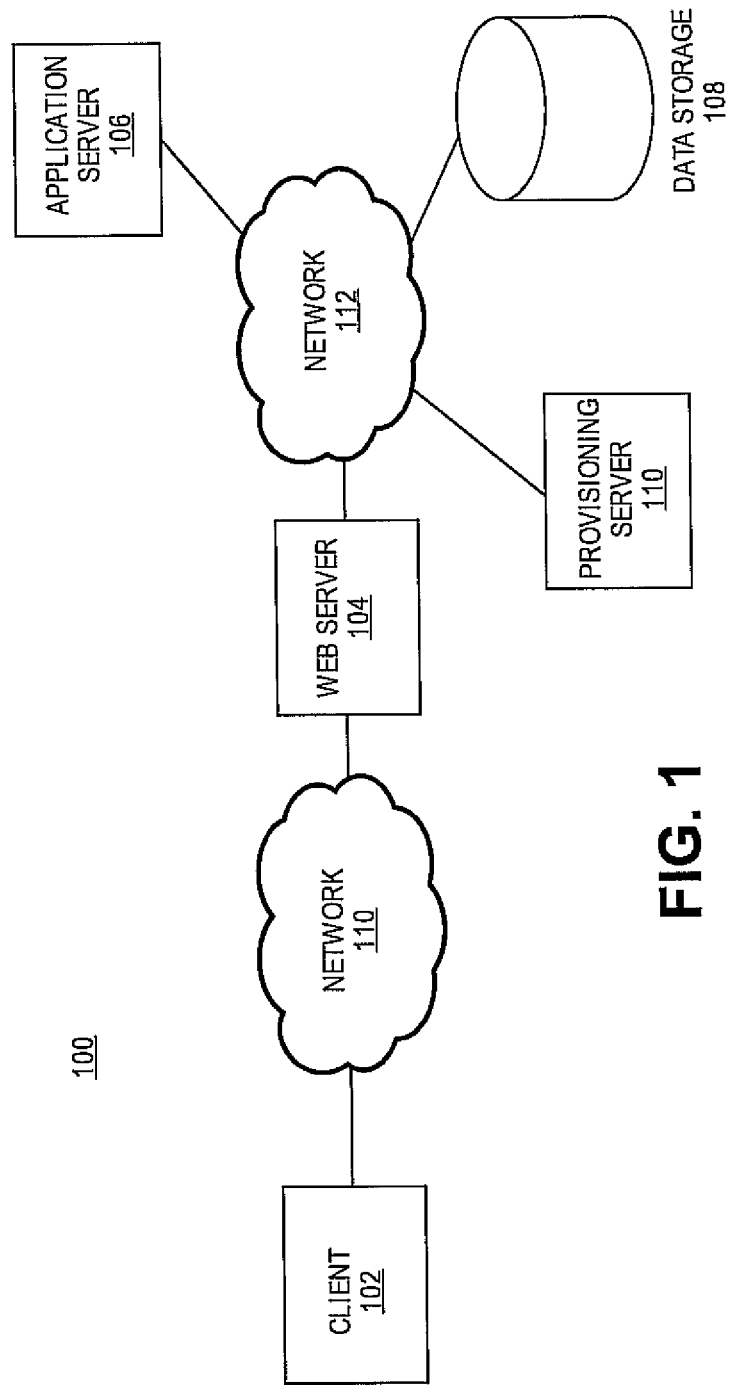
FIG. 1 illustrates an exemplary system in which the present invention may be implemented.
Figure 2:
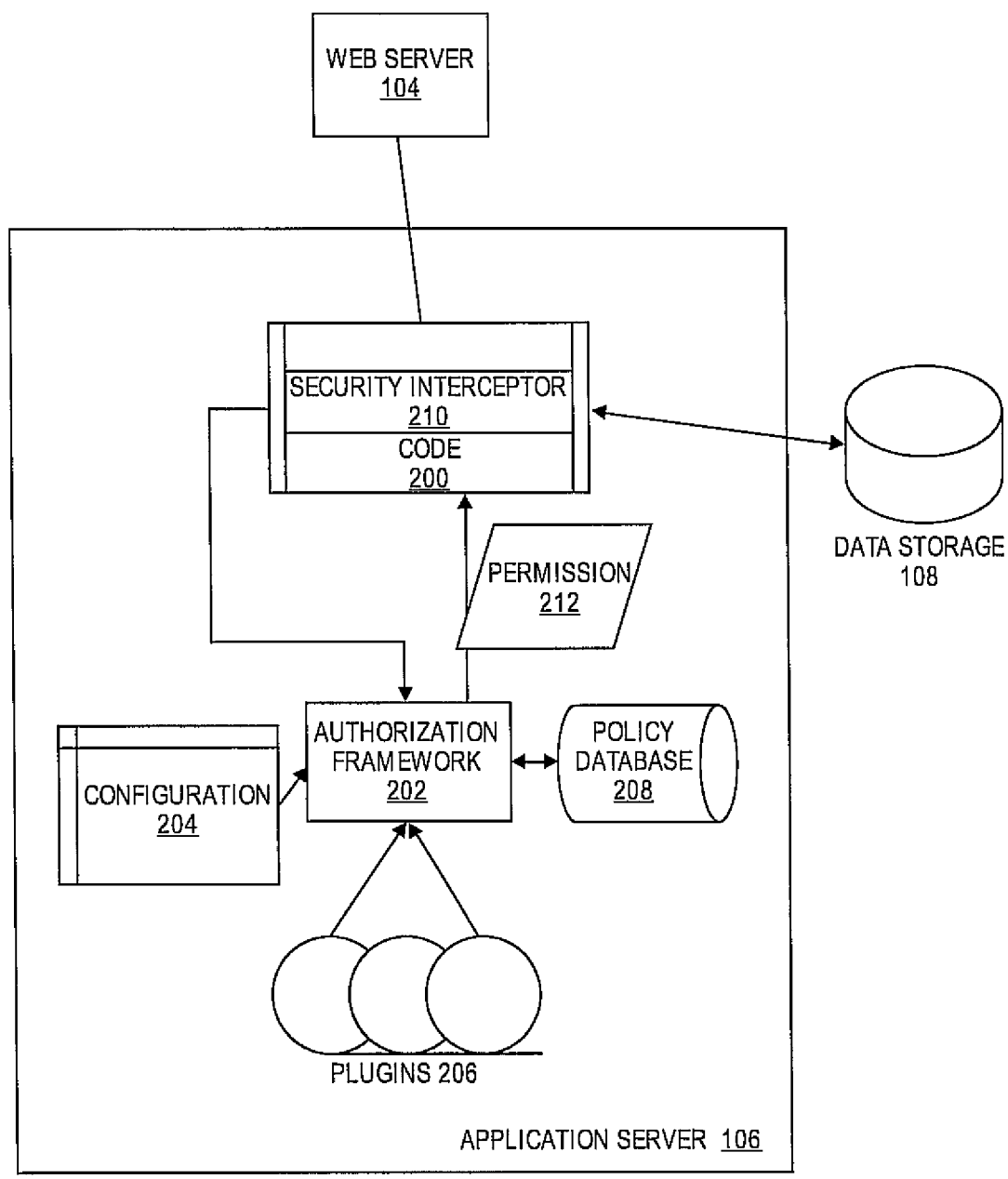
FIG. 2 illustrates an exemplary software architecture for implementing the present invention.
Figure 3:
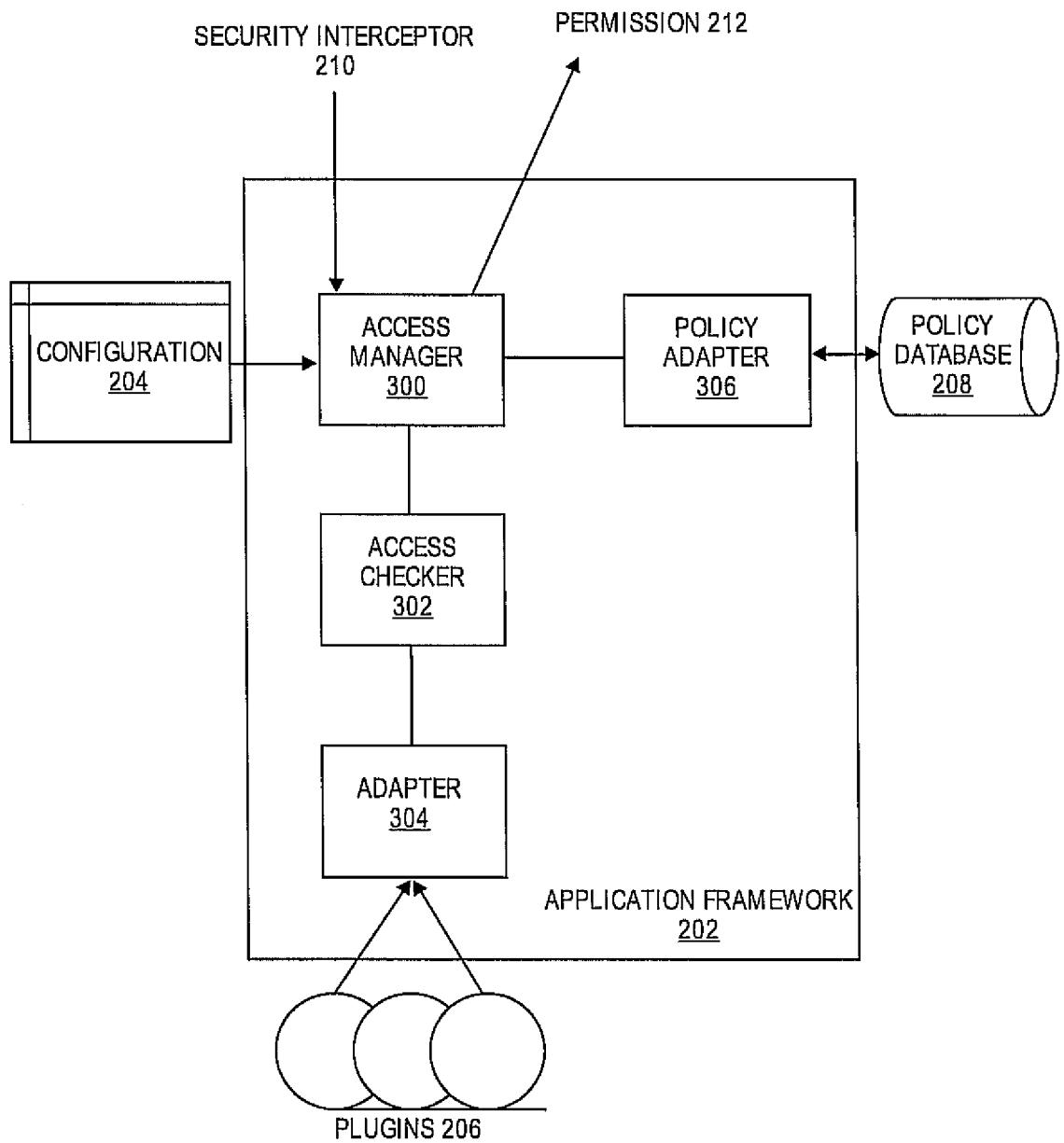
FIG. 3 illustrates an exemplary authorization framework that is consistent with the present invention.
Figure 4:
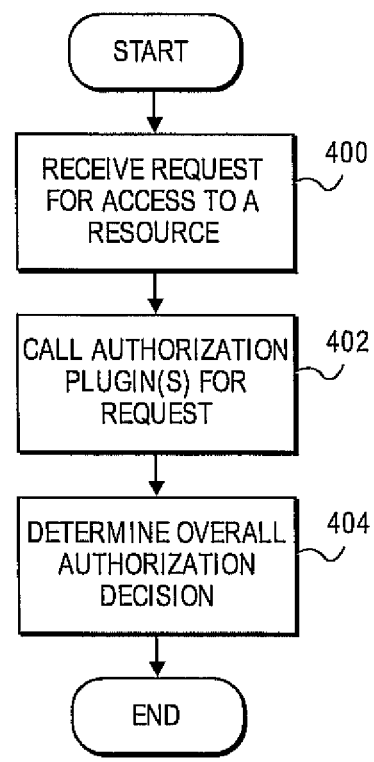
FIG. 4 illustrates an exemplary process flow for authorization in accordance with the present invention.

Reference will now be made in detail to the exemplary embodiments of the invention, which are illustrated in the accompanying drawings. Wherever possible, the same reference numbers will be used throughout the drawings to refer to the same or like parts. In FIG. 1, an overall system in which the present invention may be implemented is illustrated. FIG. 2 is then provided to illustrate an exemplary application server in which the present invention may be implemented. FIG. 3 illustrates an exemplary software architecture for the authorization framework of the present invention. Finally, FIG. 4 is provided to illustrate an authorization process flow in accordance with the principles of the present invention. These figures will now be described below.

FIG. 1 illustrates an exemplary system 100 in which the present invention may be implemented. As shown, system 100 may comprise a client 102, a web server 104, and an application server 106, which accesses data storage 108. These components are coupled together via networks 110 and 112 respectively. Each of these components will now be further described.

Client 102 may be any computer system that utilizes the services of another computer system, i.e., web server 104 and application server 106. As shown in FIG. 1, client 102 may be implemented using components well known to those skilled in the art, such as a personal computer, laptop computer, personal digital assistant, a mobile phone, and the like. In the embodiments shown in FIG. 1, client 102 may be used to run Web applications via an application, such as web browser.

Web server 104 is computer system that accepts requests from clients, such as client 102, and serving responses along with optional data contents. In the embodiment shown, this content served by web server 104 is usually one or more Web pages that includes hypertext markup language (HTML) documents and linked objects (images, video, audio, etc.).

Web server 104 may be implemented on a machine that comprises well known hardware and software. Well known software for web server 104 may be software, such as Apache HTTP Server from the Apache Software Foundation, Internet Information Services by Microsoft Corporation, and Sun Java System Web Server from Sun Microsystems Inc. One skilled in the art will recognize that any of the many different Web server programs available are consistent with the principles of the present invention.

Application server 106 is software that provides applications to client 102. Application server 106 may be configured to handle security, business logic, data access for the applications provided to the client 102. Application server 106 may provide a variety of Web-based applications, such as e-commerce applications, content management applications, customer relations management applications, and the like.

Application server 106 may be implemented on various software platforms. For example, application server 106 may be implemented on the well known J2EE platform from Sun Microsystems Inc. In addition, application server 106 may comprise middleware to enable applications to intercommunicate with dependent applications, like web server 104, database management systems, etc.

Application server 106 may be implemented using well known software. For example, application server 106 may be implemented using software, such WebLogic server from BEA Systems Inc., JBoss from Red Hat Inc., Websphere from the IBM Corporation, and the like.

Accordingly, application server 106 may implement the Java programming language and provide Web modules using servlets and JavaServer pages. Other functions of application server 106 may also employ Java. For example, business logic provided by application server 106 may be built into Enterprise JavaBeans (EJBs). J2EE provides standards for containing the Web components. Security services, such as authentication and authorization, may be implemented using Pluggable Authentication Modules (PAM) and the authorization framework of the present invention.

Authentication is the process of determining the identity of a user. The Java platform provides APIs that enable an application to perform user authentication via pluggable login modules available via PAM. For example, applications provided by application server 106 may call into a login class, which in turn references a configuration in application server 106. The configuration specifies which login module is to be used to perform the actual authentication.

The authorization framework protects access to sensitive resources (for example, files in data storage 108) or sensitive application code. All access control decisions are mediated by the authorization framework. The authorization framework of the present invention will be further described below.

Data storage 108 refers to the infrastructure of components that store resources of system 100. For example, data storage 108 may comprise devices, such as hard disks, optical drives, disk array controllers, tape libraries, and servers.

Network 110 represents the communications infrastructure for allowing client 102 and web server 104 to communicate with each other. For example, network 110 may represent the Internet, which is a worldwide, publicly accessible network that uses the Internet Protocol (IP) suite of standards.

Network 112 represents the communications infrastructure that allows web server 104, application server 106, and data storage 108 to communicate with each other. Network 112 may be implemented as a local area network or may utilize one or more larger networks, such as the Internet.

FIG. 2 illustrates an exemplary software architecture for implementing the present invention. In particular, FIG. 2 illustrates an exemplary software architecture for application server 106. As shown, application server 106 may be running code 200 for web server 104 to access various resources in data storage 106. Code 200 may receive its authorization from authorization framework 202. Authorization framework 202 may comprise a configuration 204, and may be coupled to one or more authorization plugins 206 and a policy database 208. These components and some of their interaction will now be further described.

Code 200 represents the code that application server 106 is running for web server 104. For example, code 200 may be a container, which is a data structure whose instances are collections of other objects. As a container, code 200 can be used to store objects in an organized way following specific access rules. In addition, code 200 may implement various methods to perform its functions.

For example, code 200 may be an Enterprise Java Bean (EJB). An EJB is a managed, server-sided component for modular construction of enterprise applications provided by application server 106 for web server 104. EJBs are structured according to the well known Java APIs. EJB encapsulates the business logic of an application and, as a result, may require authorization services to access to sensitive resources. Of course, code 200 may represent any code that requests access to a sensitive resource via the authorization framework of the present invention.

Security interceptor 210 is the part of code 200 that calls for services of the authorization framework 202. Accordingly, security interceptor 210 is where security is enforced in code 200.

Authorization framework 202 provides authorization services to application server 106. Authorization is the process of protecting the resources of system 100 by only allowing those resources to be used by users that have been granted authority to use them. Resources may be individual files or data in data storage 108, computer programs, other devices, or the functionality of other applications. Of note, users of authorization framework may be any entity that requires access to resources of system 100. As such, computer programs and other devices on the computer may be "users" of authorization framework 202.

In some embodiments, authorization framework 202 may have a stack of configurable authorization modules implemented by plugins 206. In addition, these modules can implement extensible access control markup language (XACML), Java authorization contract for containers (JACC), a custom policy, etc.

Authorization framework 202 provides a reusable design that readily accessible via APIs and may include support programs, code libraries, a scripting language, or other software to help develop and glue together the different components of an application being provided by application server 106. As noted, various parts of authorization framework 202 may be exposed through an API. For example, authorization framework 202 may provide APIs for authorization plugin modules 206 and for a policy, such as a policy retrieved from a policy database 208.

Configuration 204 may be a file is configures the settings of the authorization framework 202. In some embodiments, configuration 204 may be edited as needed to allow authorization framework 202 to adapt its authorization services. Hence, configuration 204 may be a file written in ASCII or a simple database.

Authorization framework 202 may read its configuration 204 only at startup or may periodically check configuration 204 for changes. Alternatively, authorization framework 202 may be triggered to read its configuration 204 and apply the changes to the current authorization process, or read one or more external files as the new configuration.

Plugins 206 is code that interacts with authorization framework 202 to perform specific authorization processes on demand. Authorization framework 202 may provide an API which plugins 206 can use. For example, the API may specify the way for plugins 206 to register themselves and a protocol by which data is exchanged with authorization framework 202 or other plugins. Of note, the pluggable architecture of authorization framework 202 allows it to be independent of the plugins 206 and makes it possible for plugins to be added and updated dynamically without significant changes to authorization framework 202.

Each of plugins 206 may implement their own individual authorization process. For example, one of plugins 206 may implement an XACML policy. XACML is a well known declarative access control policy language. Meanwhile, another of plugins 206 may implement a JACC policy for authorization. JACC is a binding of container access decisions to operations on instances of these permission classes. JACC defines the installation and configuration of authorization providers for use by containers in J2EE.

Policy database 208 serves as source of the overall security policy implemented by authorization framework 202. A security policy may be any definition of the constraints on behavior of users and components in system 100. The security policy may also specify functions and flow among them, access by external systems and adversaries including programs and access to data by users.

Permissions 212 indicate the authorization decision of authorization framework 202. For example, in J2EE, authorization framework 202 may issue its permissions using an abstract Java class for representing access to a system resource. These permissions may have a name (whose interpretation depends on the subclass), as well as abstract functions for defining the semantics of a particular permission subclass. Permissions 212 may also include an "actions" list that tells the actions that are permitted for the object. For example, for a java.io.FilePermission object, the permission name is the pathname of a file (or directory), and the actions list (such as "read, write") specifies which actions are granted for the specified file (or for files in the specified directory).

FIG. 3 illustrates an exemplary architecture for authorization framework 202 that is consistent with the present invention. As shown, authorization framework 202 may comprise an access manager 300, an access checker 302, an adapter 304, and a policy adapter 306.

Access manager 300 is the component in charge of integrating the individual authorization decision of plugins 206 and making an overall authorization decision. In particular, access manager 300 may operate in accordance with settings provided to it from configuration 204 and enforce the policy provided from policy database 208. Access manager 300 may request and collect authorization decisions of authorization plugins 206. Access manager 300 may then combine or accumulate these individual decisions to make an overall authorization decision. In some embodiments, access manager 300 provides its authorization decisions in the form a permission object.

Of note, this architecture of authorization framework 202 is different from the conventional technology, such as JAAS. In JAAS, for example, authorization is performed based on a policy-based architecture. In contrast, authorization framework 202 utilizes a plugin architecture. This allows authorization framework 202 to provide finer grain authorization decisions than what is possible with JAAS or the other known authorization technologies. Some of the other components of authorization framework 202 will now be further described.

Access checker 302 invokes one or more of authorization plugins 206. Access checker 302 selects which of authorization plugins 206 to invoke based on commands from access manager 300.

Adapter 304 serves as an interface layer between access checker 302 and authorization plugins 206. For example, adapter 304 may be implemented in accordance with an API that support requests for services from authorization plugins 206.

Policy adapter 306 serves as an interface layer between access manager 300 and policy database 208. In particular, policy adapter 306 allows access manager 300 to utilize external mechanisms for retrieving the security policy it is intended to implement. Policy adapter 306 may also be implemented in accordance with an API.

FIG. 4 illustrates an exemplary process flow for authorization in accordance with the present invention. In phase 400, application server 106 receives a request for access to a resource of system 100. For example, a user at client 102 may request access to a file in data storage 108. Client 102 may be running a web browser or applet, which is supported by web server 104. In turn, web server 104 may call code 200 running in application server 106. Within code 200, security interceptor 210 is triggered and initiates the processing of authorization framework 202.

In phase 402, authorization framework 202 responds to security interceptor 210 and calls one or more of authorization plugin 206. In particular, access manager 300 may read configuration 204 to identify which of authorization plugins 206 need to be called. Access manger 300 may then pass this information to access checker 302.

Access checker 302 then utilizes the API in adapter 304 to call and execute the appropriate authorization plugins among plugins 206. Of note, each authorization plugins 206 may execute its own authorization process independent of the other plugins. For example, as noted above, one plugin may implement a XACML policy, while another plugin may implement a JACC policy. Of course, one or more of plugins 206 may depend on each other. Each of plugins 206 that were called then provides their authorization decision back to access checker 302 via adapter 304.

For example, one set of modules 206 may implement authorization decisions based on user roles. Privileges and permissions to access computing resources are granted to roles, instead of or in addition to granting privileges directly to users. Users that need access to resources are then assigned membership in those roles. A role can be any group of users requiring similar or identical access to computing resources. Each permission or privilege in role may specify the allowed operations (e.g., read, write, delete, create) on any number of objects. Individual objects may be identified individually or by groups.

However, others of plugins 206 may be used to implement other parameters of interest for authorization. For example, a set of modules may be used to represent a domain of users, such as an office location, a department, etc. As another example, a set of modules may be used to implement various profiles, such as time of day, time of year, type of resource, and the like. Various plugins can be tailored to specific purposes in order to assist in fine tuning the authorization decisions made by authorization framework 202.

In phase 404, access manager 300 makes an overall authorization decision for the requested resource. In particular, access checker 302 passes the individual authorization decisions of the one or more authorization plugins that were called. Access manager 300 may then combine these individual decisions to make an overall authorization decision. In some embodiments, access manager 300 may retrieve a policy from an external mechanism, such as policy database 208, via policy adapter 306. Of course, access manager 300 may attempt to implement several policies in reaching its overall authorization decision. This architecture allows access manager 300 to make its authorization decisions more flexibly in comparison to prior authorization schemes. Access manager 300 may, for example, assign weights to each of the individual decisions by plugins 206 and reach an overall decision based on their respective weights. Of course, other logic specified in the security policy may be used in access manager 300.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving a request to access a resource of a computer system storing a first plurality of authorization plugin modules;
   obtaining, by the computer system, a configuration identifying a second plurality of authorization plugin modules that is a proper subset of the first plurality of authorization plugin modules by accessing a configuration file identifying the second plurality of authorization plugin modules;
   executing, by the computer system, each of the second plurality of authorization plugin modules to generate a plurality of authorization decisions;
   obtaining, by the computer system, an authorization policy specifying logic to determine whether to grant the request based on the plurality of authorization decisions by accessing a policy database comprising a plurality of authorization policies; and
   determining, by the computer system, whether to grant the request using the logic specified in the authorization policy and the plurality of authorization decisions.

2. The method of claim 1, wherein at least one of the second plurality of authorization plugin modules is configured by an external mechanism.

3. The method of claim 1, wherein the authorization policy is defined in extensible access control markup language.

4. The method of claim 1, wherein the authorization policy implements a Java™ authorization contract for containers.

5. The method of claim 1, wherein a first authorization plugin module exchanges information with a second authorization plugin module using a protocol selected by an external mechanism.

6. The method of claim 1, wherein determining whether to grant the request comprises a cumulative decision of the plurality of authorization decisions.

7. An apparatus comprising:
   data storage to store a first plurality of authorization plugin modules; and
   a server coupled to the data storage to:
      receive a request to access a resource;
      obtain a configuration identifying a second plurality of authorization plugin modules that is a proper subset of the first plurality of authorization plugin modules by accessing a configuration file identifying the second plurality of authorization plugin modules;
      execute each of the second plurality of authorization plugin modules to generate a plurality of authorization decisions;
      obtain an authorization policy specifying logic to determine whether to grant the request based on the plurality of authorization decisions by accessing a policy database comprising a plurality of authorization policies; and
      determine whether to grant the request using the logic specified in the authorization policy and the plurality of authorization decisions.

8. The apparatus of claim 7, wherein the authorization policy is based on a set of rules.

9. The apparatus of claim 7, wherein determining whether to grant the request is based on the contents of an object.

10. The apparatus of claim 7, wherein determining whether to grant the request is based on an editable file that associates the second plurality of authorization plugin modules with a calling application that provided the request.

11. The apparatus of claim 7, wherein determining whether to grant the request comprises combining the plurality of authorization decisions.

12. The apparatus of claim 7, wherein the authorization policy is defined in extensible access control markup language.

13. The apparatus of claim 7, wherein the authorization policy implements a Java™ authorization contract for containers.

14. The apparatus of claim 7, wherein a first authorization plugin module communicates with a second authorization plugin module using a protocol selected by an external mechanism.

\* \* \* \* \*